(12) United States Patent
Sankaran et al.

(10) Patent No.: US 9,910,699 B2
(45) Date of Patent: Mar. 6, 2018

(54) VIRTUAL PROCESSOR DIRECT INTERRUPT DELIVERY MECHANISM

(71) Applicants: Rajesh M. Sankaran, Portland, OR (US); Gilbert Neiger, Hillsboro, OR (US)

(72) Inventors: Rajesh M. Sankaran, Portland, OR (US); Gilbert Neiger, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 521 days.

(21) Appl. No.: 14/525,959

(22) Filed: Oct. 28, 2014

(65) Prior Publication Data

US 2016/0117190 A1  Apr. 28, 2016

(51) Int. Cl.
G06F 9/455 (2006.01)
G06F 9/48 (2006.01)
G06F 13/24 (2006.01)

(52) U.S. Cl.
CPC ........ *G06F 9/4812* (2013.01); *G06F 9/45533* (2013.01); *G06F 13/24* (2013.01)

(58) Field of Classification Search
CPC .... G06F 9/4812; G06F 9/45533; G06F 13/24; G06F 2009/45575
See application file for complete search history.

(56) References Cited

U.S. PATENT DOCUMENTS

| | | | |
|---|---|---|---|
| 4,658,351 A | 4/1987 | Teng | |
| 5,283,904 A | 2/1994 | Carson et al. | |
| 5,530,891 A | 6/1996 | Gephardt | |
| 5,727,217 A | 3/1998 | Young | |
| 5,727,219 A | 3/1998 | Lyon et al. | |
| 6,219,743 B1 | 4/2001 | Kennel et al. | |
| 7,000,051 B2 | 2/2006 | Armstrong et al. | |
| 7,048,877 B2 | 5/2006 | Zimmer et al. | |
| 7,054,974 B2 | 5/2006 | Quach et al. | |
| 7,209,994 B1 | 4/2007 | Klaiber et al. | |
| 7,222,203 B2 | 5/2007 | Madukkarumukumana et al. | |
| 7,237,051 B2 | 6/2007 | Bennett et al. | |
| 7,281,075 B2 | 10/2007 | Armstrong et al. | |
| 7,287,197 B2 | 10/2007 | Bennett et al. | |
| 7,630,967 B1 | 12/2009 | Srivastava et al. | |
| 7,689,747 B2 | 3/2010 | Vega et al. | |
| 7,702,835 B2 | 4/2010 | Riethmuller | |
| 7,707,341 B1 | 4/2010 | Klaiber et al. | |
| 8,055,827 B2 | 11/2011 | Serebrin et al. | |
| 8,103,815 B2 | 1/2012 | Ganguly | |
| 8,131,901 B2 | 3/2012 | Mansell et al. | |
| 8,180,944 B2 | 5/2012 | Serebrin et al. | |

(Continued)

OTHER PUBLICATIONS

Intel Corporation, Intel Virtualization Technology for Directed I/O. Architecture Specification. Sep. 2013.

(Continued)

*Primary Examiner* — Ernest Unelus
(74) *Attorney, Agent, or Firm* — Womble Bond Dickinson (US) LLP

(57) ABSTRACT

A method comprising is described. The method includes receiving an interrupt targeting a virtual processor, determining a status of the virtual processor and directly delivering the interrupt to the virtual processor upon determining that the virtual processor is operating in a running state.

4 Claims, 8 Drawing Sheets

(56) References Cited

U.S. PATENT DOCUMENTS

| | | |
|---|---|---|
| 8,234,432 B2 | 7/2012 | Serebrin |
| 8,843,683 B2 | 9/2014 | Madukkarumukumana et al. |
| 2007/0157197 A1 | 7/2007 | Neiger et al. |
| 2008/0162762 A1 | 7/2008 | Neiger et al. |
| 2010/0023666 A1 | 1/2010 | Mansell et al. |
| 2011/0040914 A1 | 2/2011 | Strauss et al. |
| 2011/0161541 A1* | 6/2011 | Madukkarumukumana .............. G06F 13/24 710/260 |

OTHER PUBLICATIONS

Uhlig et al. Intel Virtualization Technology, IEEE 2005.
Nakajima, Jun. Enabling Optimized Interrupt/APIC Virtualization in KVM. Nov. 8, 2012.
Nakajima, Jun, Intel Virtualization Technology Roadmap and VT-d Support in Xen, Intel Open Source Technology, 2007.
Intel Corporation "Enabling Intel Virtualization Technology Features and Benefits" White Paper 2010.

* cited by examiner

IRTE 600

VIRTUAL PROCESSOR DIRECT INTERRUPT DELIVERY MECHANISM

FIELD

Embodiments described herein generally relate to parallel computing. More particularly, embodiments relate to a data processing system having a global address space.

BACKGROUND

The present disclosure pertains to the field of information processing, and more particularly, to the field of managing interrupts in an information processing system.

Generally, the concept of virtualization in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor ("VMM")) to present to each OS a virtual machine ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of the virtualization environment.

A physical processor in an information processing system may support virtualization, for example, by supporting an instruction to enter a virtualization environment to run a guest on a virtual processor (i.e., a physical processor under constraints imposed by a VMM) in a VM. In the virtualization environment, certain events, operations, and situations, such as external interrupts or attempts to access privileged registers or resources, are typically intercepted, i.e., cause the processor to exit the virtualization environment so that a VMM may operate, for example, to implement virtualization policies (a "VM exit").

Therefore, external interrupts may be intercepted by the VMM and routed to the appropriate virtual processor. Alternatively, a virtualization environment may provide for external interrupts to be routed to a virtual processor without a VM exit, for example, if the interrupt request is generated by an input/output ("I/O") device assigned to the currently active VM, or if the interrupt request is an inter-processor interrupt between two virtual processors in the same VM. Whether the interrupt request causes a VM exit or not, routing the interrupt to the appropriate virtual processor may include mapping interrupts requests from a guest's view of the system to a host's view of the system. In existing information processing systems, the VMM may be responsible for remapping interrupt requests whenever a virtual processor is migrated from one physical processor to another physical processor.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

The present invention may be embodied in systems, apparatuses, and methods for posting interrupts to virtual processors, as described below. In the description, numerous specific details, such as component and system configurations, may be set forth in order to provide a more thorough understanding of the present invention. In other instances, well-known structures, circuits, and the like have not been shown in detail, to avoid unnecessarily obscuring the present invention.

Embodiments provide for programming and managing hardware that supports posted interrupts to enable direct delivery of external interrupts to a virtual processor with low latency. Further embodiments provide algorithms that enable a Virtual Machine Monitor (VMM) (or hypervisor software) to efficiently process interrupts processed through posted interrupts hardware.

According to one embodiment, external interrupts targeting running virtual processors are delivered directly to the virtual processor without VMM involvement. In a further embodiment, external interrupts targeting pre-empted virtual processors are buffered without disturbing running virtual processors. In such an embodiment, the buffered interrupts are delivered when the virtual processors are next scheduled.

In yet a further embodiment, VMM control is obtained for external interrupts to blocked (idle) virtual processors to enable the VMM to schedule the virtual processors. In still a further embodiment, all external interrupts to a virtual processor are co-migrated whenever a virtual processor is migrated from one logical central processing unit (CPU) to another logical CPU.

The above-described embodiments operate for both lowest-priority interrupts, as well as level-triggered external interrupts. Moreover, a mechanism is provided for handling real-time interrupts (e.g., from media devices and/or communication/modem devices) that are qualified as urgent.

Elements of embodiments of the invention may be implemented in hardware, software, firmware, or any combination of hardware, software, or firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or an expression that is implemented or embodied in a hardware structure (e.g., flash memory or read only memory). Examples of firmware are microcode, writable control store, and micro-programmed structure.

Figure 1:
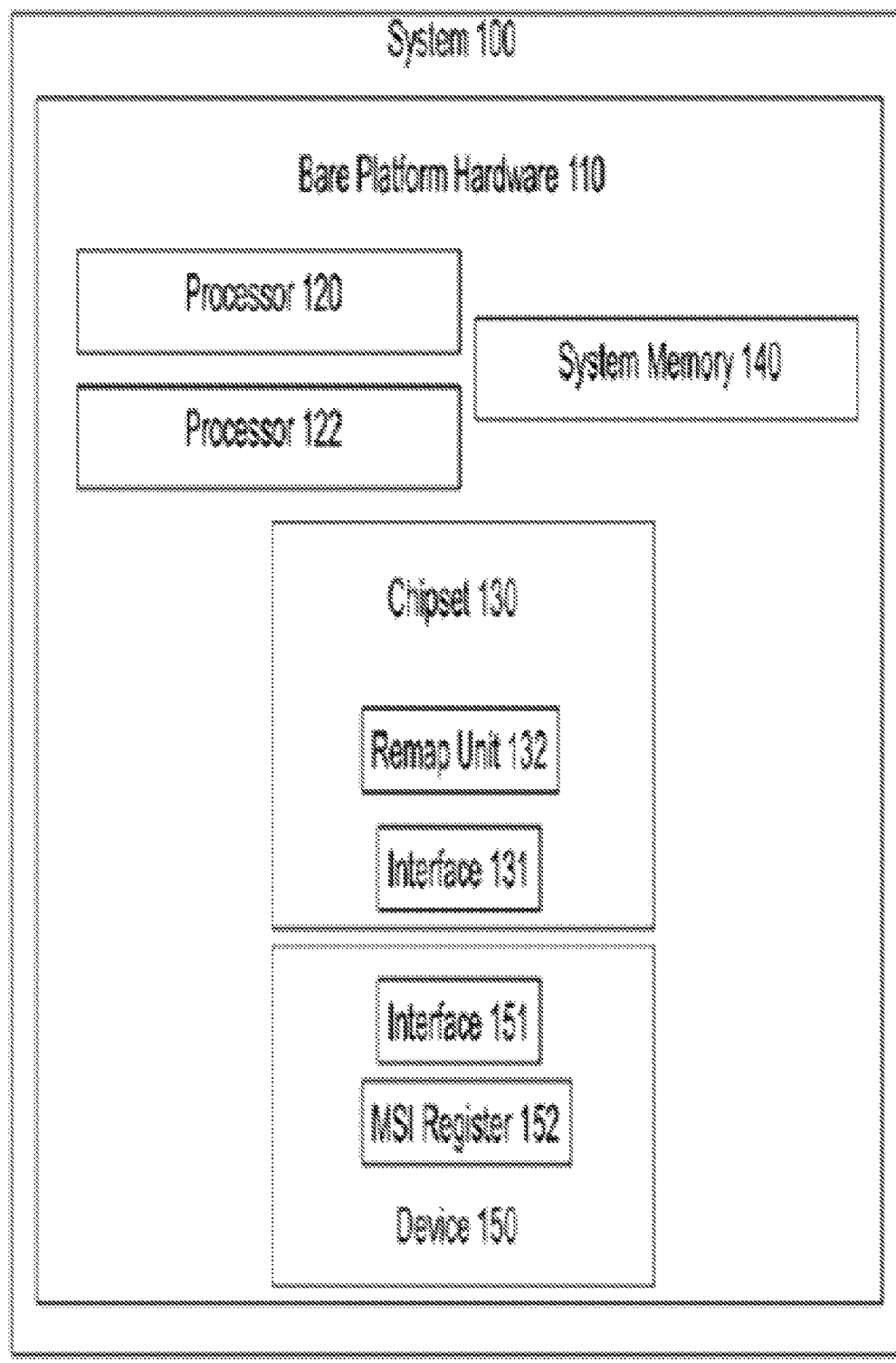
FIG. 1 illustrates one embodiment of a system for posting interrupts to virtual processors.

FIG. 1 illustrates one embodiment of an information processing system 100. In one embodiment, information processing system 100 includes bare platform hardware 110, which may be any apparatus capable of executing any OS, VMM, or other software. For example, bare platform hardware 110 may be the hardware of a personal computer, a mainframe computer, a portable computer, a handheld device, a set-top box, a server, or any other computing system. In this embodiment, bare platform hardware 110 includes processors 120 and 122, chipset 130, system memory 140, and device 150.

Processors 120 and 122 may be any components having one or more execution cores, where each execution core may be based on any of a variety of different types of processors, including a general purpose microprocessor, such as a processor in the Intel® Pentium® Processor Family, Itanium® Processor Family, or other processor family from Intel® Corporation, or another processor from another company, or a digital signal processor or microcontroller. Although FIG. 1 shows two processors, bare processing hardware 110 may include any number of processors, including any number of multicore processors, each with any number of execution cores, and any number of multi-threaded processors, each with any number of threads.

Chipset 130 may be any group of circuits and logic that supports memory operations, input/output operations, configuration, control, internal or external interface, connection, or communications functions (e.g., "glue" logic and bus bridges), and/or any similar functions for processors 120 and 122 and/or system 100. Individual elements of chipset 130 may be grouped together on a single chip, a pair of chips, dispersed among multiple chips, and/or be integrated partially, totally, redundantly, or according to a distributed approach into one or more processors, including processors 120 and/or 122. In this embodiment, chipset 130 includes interrupt remapping unit 132 for remapping or posting interrupts, as described below. In other embodiments, interrupt remapping unit 132 may be included elsewhere in system 100.

System memory 140 may be any medium on which information, such as data and/or program code, may be stored, such as static or dynamic random access memory, semiconductor-based read-only or flash memory, magnetic or optical disk memory, or any other type of medium readable by processors 120 and 122, or any combination of such mediums.

Device 150 may represent any type of I/O, peripheral, or other device that may be the source of an interrupt request, such as a keyboard, mouse, trackball, pointing device, monitor, printer, media card, network interface, information storage device, etc. Device 150 may be embodied in a discrete component, or may be included in an integrated component with any other devices. In one embodiment, device 150 may represent a function in a multifunctional I/O, peripheral, or other device.

Processors 120 and 122, chipset 130, system memory 140, and device 150 may be coupled to or communicate with each other according to any known approach, such as directly or indirectly through one or more parallel, sequential, pipelined, asynchronous, synchronous, wired, wireless, or other bus or point-to-point connection or means of communication. For example, in this embodiment chipset 130 includes interface 131 to receive signals, messages, and/or transactions, such as interrupt requests, from device 150, or transmit signals, messages, and/or transactions to device 150 and/or any other agents or components in system 100, through any such connection or other means of communication. Similarly, device 150 includes interface 151 to transmit and/or receive signals, messages, and/or transactions to chipset 130, and/or any other agents or components in system 100. System 100 may also include any number of additional agents, components, or connections.

Figure 2:
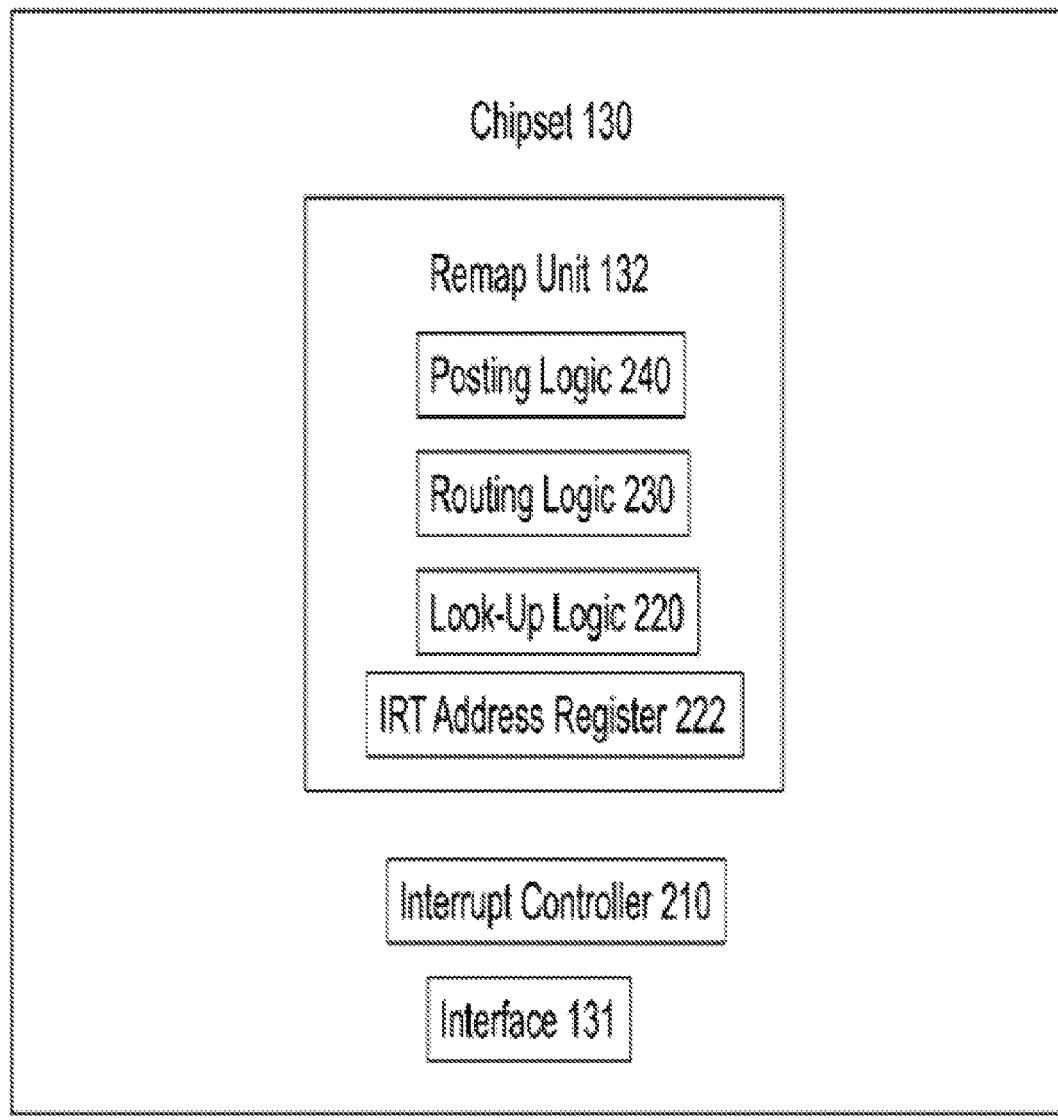
FIG. 2 illustrates one embodiment of an apparatus for posting interrupts to virtual processors.

FIG. 2 illustrates one embodiment of a chipset 130, which includes remapping unit 132. Remapping unit 132 includes look-up logic 220, routing logic 230, and posting logic 240. Chipset 130 also includes interface 131, described above, and interrupt controller 210.

Chipset 130 may receive an interrupt request through interface 131. An interrupt request may also be generated from within chipset 130. For instance, a timer or other device included in chipset 130 may generate an interrupt. In one embodiment, an interrupt request may be received as a signal, such as a level or edge triggered interrupt signal, according to any known signaling protocol. In another embodiment, an interrupt request may be received as a message, such as a bus message or a point-to-point transaction, according to any known message, transaction, or other communication protocol. Other embodiments are possible, including an embodiment using both signal and message based interrupt requests. In such an embodiment, chipset 130 may receive both types of requests; signal based requests through input terminals and message based requests through write transactions to an address or port corresponding to a register or other storage location assigned to the interrupt controller.

Figure 3:
FIG. 3 illustrates one embodiment of a message signaled interrupt format.
Figure 3:
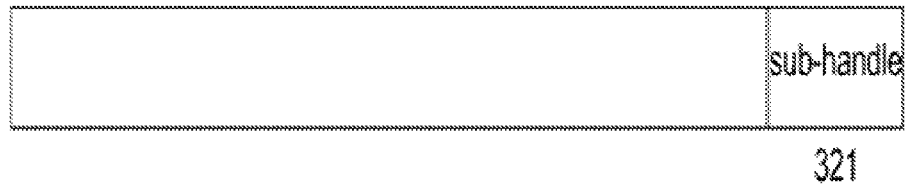

Look-up logic 220 is to look up an entry associated with an interrupt request (e.g., from device 150) in a data structure. Look-up logic 220 may be implemented with any logical structure or circuitry that performs a function of looking up or finding an entry in a data structure. The entry may be found using a "handle" as an entry number, address, index, pointer, or other locator of or to a particular entry in the data structure, where the handle is a value supplied directly or indirectly by the interrupt request. For example, according to a message signaled interrupt ("MSI") protocol of a PCI-Express bus, an interrupt message may include a 32-bit address field and a 32-bit data field, where bits 31:20 of the address field are set to the hexadecimal value "FEE" to indicate that the message is an interrupt request. The remaining bits of the fields may be used to indicate other information, such as the interrupt vector and the desired destination for the interrupt request. FIG. 3 illustrates one embodiment of a format implemented in such a protocol.

In FIG. 3, 32-bit address field 310 includes bit-fields 311, 312, and 313, and 32-bit data field 320 includes bit-field 321. Bit-field 311 may include bits 31:20 of address field 310, and may be set to the hexadecimal value "FEE" to indicate that the message is an interrupt request. Bit-field 312 may include bits 19:5 and bit 2 of address field 310, and may be used to indicate a 16-bit handle value. Bit-field 313 may include bit 3 of address field 310, and may be used to indicate a 1-bit sub-handle valid ("SHV") value. Bit-field 321 may include bits 15:0 of data field 320, and may be used to indicate a 16-bit sub-handle value. The use of the SHV and sub-handle values will be described below. The remaining bits of address field 310 and data field 320 may be treated as reserved or ignored.

Figure 4:
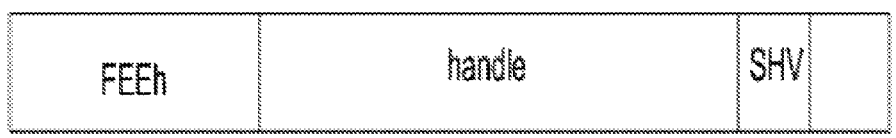
FIG. 4 illustrates one embodiment of a message signaled interrupt register format compatible.
Figure 4:

In order to generate an MSI transaction in such a format, device 150, or any other device in system 100, including a device integrated into chipset 130, may include a register or other storage location such as MSI register 152, as shown in FIG. 4. MSI register 152 may include 32-bit address field 410 and 32-bit data field 420. Address field 410 includes bit-fields 411, 412, and 413, and data field 420 includes bit-field 421. Bit-field 411 may include bits 31:20 of address field 410, and may be set to the hexadecimal value "FEE" to indicate that the message is an interrupt request. Bit-field 412 may include bits 19:5 and bit 2 of address field 410, and may be used to indicate a 16-bit handle value. Bit-field 413 may include bit 3 of address field 410, and may be used to indicate a 1-bit sub-handle valid ("SHV") value. Bit-field 421 may include bits 15:0 of data field 420, and may be used to indicate a 16-bit sub-handle value. The use of the SHV and sub-handle values will be described below. The remaining bits of address field 410 and data field 420 may be treated as reserved or ignored.

In one embodiment where an interrupt request is sent as a signal, the signal may be received by or passed to interrupt controller 210. For example, interrupt controller 210 may have any number of input terminals (e.g., 24), each of which may be connected to a device (e.g., through an internal connector to a device within chipset 130, or through an internal connector to a pin or other terminal of chipset 130 to an external connector to a device external to chipset 130) that may generate an interrupt request, and interrupt controller 210 may include or have access to the same number (e.g., 24) of storage locations that may be programmed with or otherwise contain the information associated with each interrupt request, including a handle value.

Figure 5:
FIG. 5 illustrates one embodiment of an interrupt controller redirection table register format.

For example, in an embodiment where interrupt controller 210 is an I/O Advanced Programmable Interrupt Controller ("IO APIC") according to the architecture of the Intel® Pentium® Processor Family, the redirection table ("RT") register of the I/O APIC may be programmed as shown in FIG. 5 in order to generate interrupts that are compatible with an embodiment of the invention. In FIG. 5, RT entry 500 includes bit-fields 511, 512, 513, 514, 515, 516, 517, 518, and 519. Bit-field 511 includes bits 63:48 of RT entry 500, to indicate a 16-bit handle value. Bit-fields 512, 513, 514, 515, 516, and 517 include bits 16, 15, 14, 13, 12, and 11, respectively, of RT entry 500, to indicate mask, trigger mode, remote interrupt request register, interrupt input pin polarity, delivery status, and destination mode values, respectively, and provide the functionality of the known programming model. Bit-field 518 includes bits 10:8 of RT entry 500, to be set to logical '000' or '111' to indicate that the delivery mode is fixed or external, respectively. Bit-field 519 includes bits 7:0 of RT entry 500, to indicate an 8-bit interrupt vector.

Returning to look-up logic 220 of FIG. 2, in one embodiment look-up logic 220 may use a 16-bit handle from an MSI transaction or a 16-bit handle from an IO APIC to find an entry in a single level interrupt remapping table ("IRT") having 64K entries, each entry having 128 bits (each an "IRTE"). In another embodiment, where an MSI transaction includes an SHV that is set to a logical '1', or otherwise indicates that it includes a valid sub-handle, a 16-bit sub-handle from the transaction may be applied (e.g., logically or arithmetically combined with, as a mask or offset value) to a 16-bit handle from the transaction to form an effective handle, and the effective handle may be used by look-up logic 220 to find an IRTE. The value of the effective handle may be checked to ensure that it is directing look-up logic 220 to a location within the IRT. Other embodiments may use different sizes of handles, sub-handles, effective handles, and IRTs.

An IRT, or any other data structure to which look-up logic 220 refers, may be stored in system memory 140, or in any other storage area in system 100. In some embodiments, IRTEs may be cached in a storage area in remapping unit 132 or in any other area that is temporally or physically nearer to look-up logic 220 than the IRT. The base address of the IRT may be stored in IRT address register 222, or any other storage location accessible to look-up logic 220.

Figure 6:
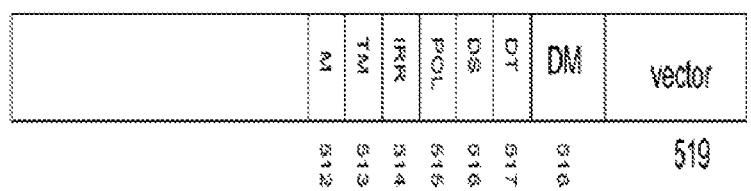
FIG. 6 illustrates one embodiment of an interrupt remapping table entry.
Figure 6:
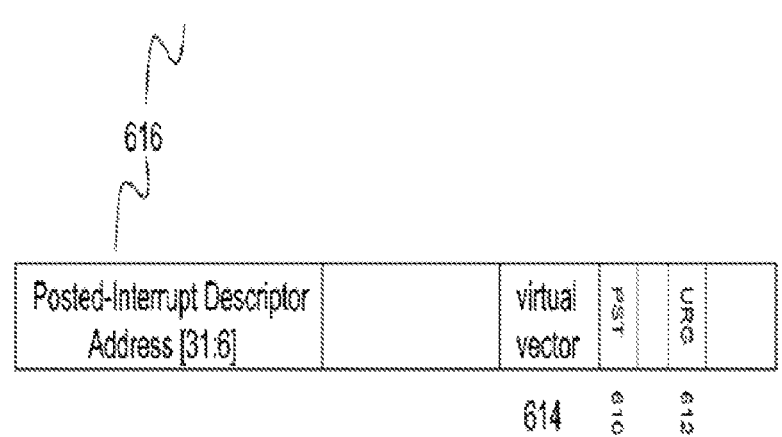

In one embodiment, each IRTE may have the format shown in FIG. 6. In FIG. 6, IRTE 600 includes bit-fields 610, 612, 614, and 616. Bit-field 610 may include bit 15 ("PST") to indicate whether the interrupt request directed to this IRTE is to be remapped or posted. For example, if this bit is clear (PST is '0'), then an interrupt request directed to this IRTE will be forwarded by routing logic 240 to a destination corresponding to a destination value in the IRTE, depending on the values of other bit-fields in the IRTE. For example, if a requestor identifier from the interrupt request does not match a source value in the IRTE, the interrupt request may be blocked. Routing logic 230 may also block the interrupt request based on other criteria.

However, in this embodiment, if this bit is set (PST is '1'), then an interrupt request directed to this IRTE will be posted by posting logic 250, as described below. If the IRTE is designated for posting (e.g., PST is '1'), then bit-fields 612, 614, and 616 are defined and used as set forth below, and the remaining bits of the IRTE may be treated as reserved or ignored. However, if the IRTE is designated for remapping (e.g., PST is '0'), then the entire IRTE is defined and used as according to the specified remapping protocol.

If the IRTE is designated for posting (e.g., PST is '1'), then bit-field 612, 614, and 616 may be defined and used as follows. Bit-field 612 may include bit 12 ("URG") to indicate is the interrupt request is urgent (i.e., time sensitive). The URG bit may be used to differentiate between interrupt requests that are urgent, such as from media devices, and interrupt requests that are more tolerant to interrupt processing latencies. Bit-field 614 ("Virtual Vector") may include bits 23:16 to indicate an eight bit virtual interrupt vector that is assigned to this interrupt request by the guest software running on the virtual processor that is the target of this interrupt request. Bit field 616 ("Posted-Interrupt Descriptor Address") may include bits 127:96 and 63:38 to indicate an address of a data structure for posting interrupts (a "posted-interrupt descriptor").

The posted-interrupt descriptor, or any other data structure to which the IRTE for a posted interrupt request refers, may be stored in system memory 140, or in any other storage area in system 100. In one embodiment, a posted-interrupt descriptor may be the size of a line of a cache accessible to processors 120 and 122, and the address may be aligned to a cache line. For example, a posted-interrupt descriptor may be 64 bytes, with an address having all zeroes in the six least significant bits, therefore bit-field 616 may be used to store bits 63:6 of an address in the address space of processors 120 and 122.

Figure 7:
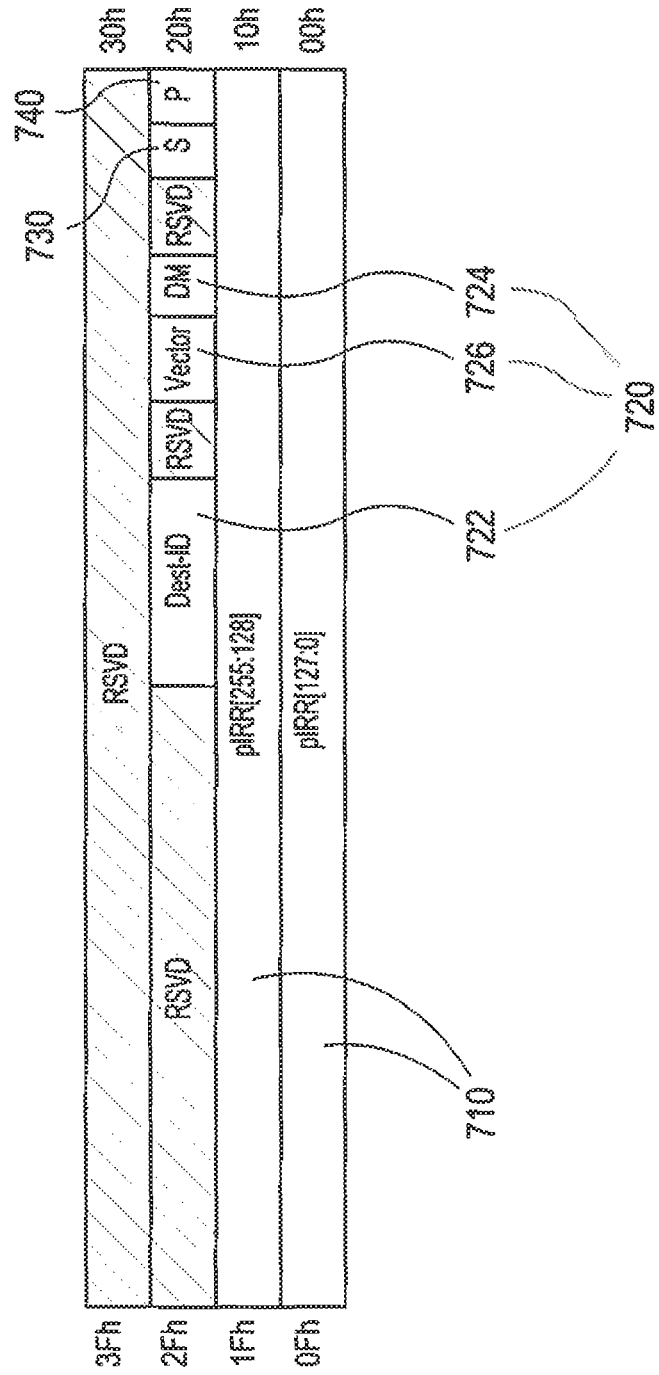
FIG. 7 illustrates one embodiment of a posted-interrupt descriptor.

Software, such as a VMM, may allocate a posted-interrupt descriptor for each virtual processor that may be the target of external interrupt requests. FIG. 7 illustrates one embodiment of a posted-interrupt descriptor. Posted-interrupt descriptor 700 in FIG. 7 includes bit-fields 710, 720, 730, and 740.

Bit-field 710 may include the lowest 32 bytes of the 64-byte posted-interrupt descriptor to form a 256-bit posted interrupt request register ("pIRR"). Each bit of the pIRR may correspond to one of 256 virtual interrupt vectors for the virtual processor corresponding to the posted-interrupt descriptor. Each bit of the pIRR may be set to post an interrupt request for the corresponding virtual interrupt vector.

Bit-field 720 may include three smaller bit-fields to indicate attributes of a notify event to be used to inform a VMM of pending posted interrupts. In one embodiment, the event used to notify a VMM that posted interrupts are pending may be a physical interrupt request to a physical processor. Therefore, using a physical processor that may support over one hundred physical interrupts, embodiments of the present invention may provide for over one hundred virtual processors per physical processor.

Notify event attributes bit-field 720 may include bit-fields 722, 724, and 726. Bit-field 722 ("Dest-ID") may include 32 bits to identify the destination of the interrupt request, which, for example, may be the local APIC for the physical processor on which the virtual processor that is the target of the interrupt request is running. The physical processor to which the target virtual processor has temporal affinity may change as virtual processors are migrated, so this field may be reprogrammed, by the VMM, with a new local APIC identifier in connection with a migration for load balancing or any other reason. The physical processor to which a target virtual processor has temporal affinity at any given time may be called the "notify-CPU" in this description, as it will be the physical processor to which a notify event will be sent when there are pending posted interrupts for that virtual processor.

Bit-field 724 ("DM") may include a single bit to indicate the mode for the notify event. For example, in an embodiment where the notify event is a physical interrupt, DM may indicate whether the value of Dest-ID should be interpreted as a physical or a logical identifier ("ID"). Bit-field 726 ("Physical Vector") may include eight bits to indicate the physical vector to be used for the notify event. When a notify event is delivered to the VMM, the VMM may use the physical vector to determine which virtual processor has pending posted interrupts in its posted-interrupt descriptor. Therefore, embodiments of the present invention provide for a single physical vector per virtual processor, instead of a physical vector for each virtual interrupt.

Bit-field 730 ("Suppress" or "S") may include one bit to store a suppress flag to indicate whether notify events are to be suppressed when posting interrupts to this posted-interrupt descriptor. Software, such as VMM, may set this bit at any time to suppress notify events, such as when the corresponding virtual processor is not running because it is in the scheduler wait queue, waiting for one of its quanta of time to run. Bit-field 740 ("Pending" or "P") may include one bit to store a pending flag to indicate whether there is a pending notify event for this posted-interrupt descriptor that has not been serviced yet. If this flag is already set at the time an interrupt request is posted, then there is no need to send another notify event. This flag may be set by hardware when it sends a notify event, and cleared by software as part of servicing the notify event.

According to one embodiment, a virtual processor may transition between Running, Pre-empted and Idle (blocked) states. A Running virtual processor is a virtual processor that is actively operating, while a Pre-empted virtual processor is one that has been de-scheduled to run another virtual processor. For example, a virtual processor may enter a Pre-empted state upon being de-scheduled by the VMM upon a quanta of time for the virtual processor has expired (e.g., when a pre-emption timer expires), thus forcing the virtual processor to exit. An Idle/Blocked virtual processor is a virtual processor that has indicated (e.g., to the VMM) that it has no operations to perform.

In one embodiment, an interrupt may be received while a virtual machine is Running, Pre-empted and Idle/Blocked states. In such an embodiment, external interrupts targeting a running virtual processor are delivered directly to the virtual processor without VMM involvement and external interrupts targeting pre-empted virtual processors are buffered without disturbing running virtual processors and delivered when the virtual processor is next scheduled. Further, VMM control is obtained for external interrupts to an Idle/Blocked virtual processor to enable the VMM to schedule the virtual processor.

Figure 8:
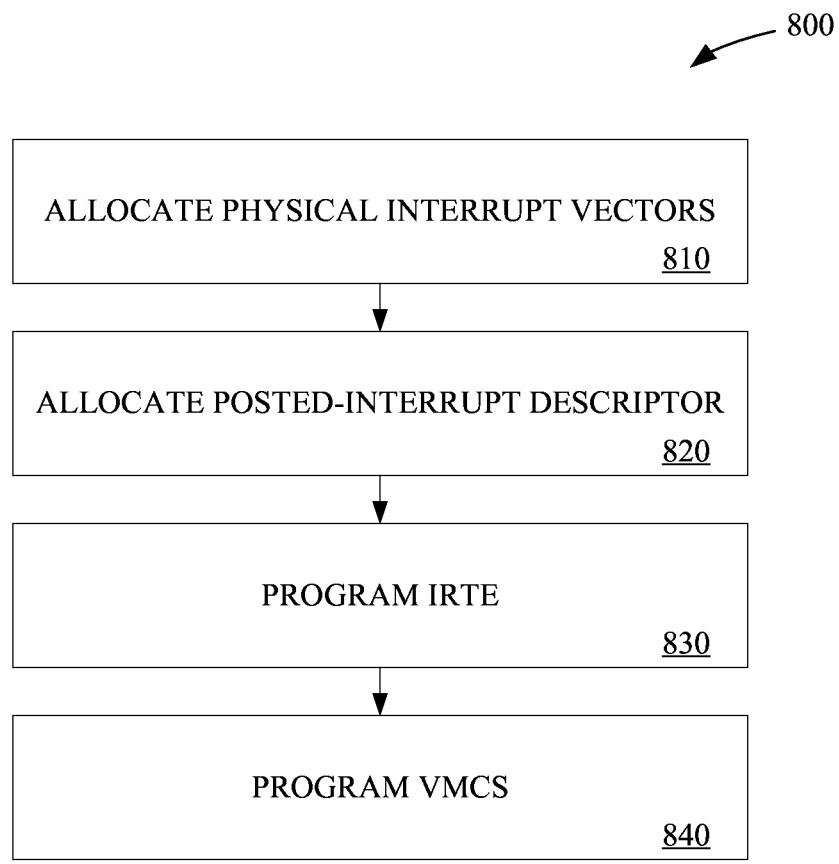
FIG. 8 illustrates one embodiment of a method for enabling posted interrupts at a virtual processor.

FIG. 8 illustrates one embodiment of a method 800 for enabling posted interrupts at a virtual processor. Method 800 may be performed by processing logic that may comprise hardware (e.g., circuitry, dedicated logic, programmable logic, etc.), software (such as instructions run on a processing device), or a combination thereof. In one embodiment, method 800 may be performed by the VMM. The processes of method 800 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-2 may not be discussed or repeated here.

Method 800 begins at block 810 with the VMM allocating physical interrupt vectors in bit-field 724. In such an embodiment, the VMM allocates two host physical interrupt vectors, which include a Running Notification Vector (RNV) and a Blocked Notification Vector (BNV). In one embodiment, RNV is used as notification vector when a virtual processor is running, and BNV is used as notification vector when the virtual processor is idle/blocked.

At block 820, a posted-interrupt descriptor is allocated for each virtual processor enabled for posted interrupts. According to one embodiment, a posted-interrupt descriptor is initialized with RNV as a notification vector value, and the Dest-ID bit-field field with the APIC identifier of a logical CPU on which the virtual processor is expected to be scheduled. Subsequently, the suppress bit-field 730 is initialized to be set. In one embodiment, the suppress bit-field 730 is cleared by the VMM as part of scheduling the virtual processor, as will be described in more detail below.

At block 830, an Interrupt Remap Table Entry IRTE corresponding to each external interrupt is programmed to be posted in the posted-IRTE format, with a pointer to the posted-interrupt descriptor of the target virtual processor. At block 840, a Virtual Machine Control Structure (VMCS) data structure implemented at system 100 is programmed for a virtual processor to enable posted interrupts. In addition, the pointer to the posted-interrupt descriptor and the notification vector value of RNV are programmed for the virtual processor.

Figure 9:
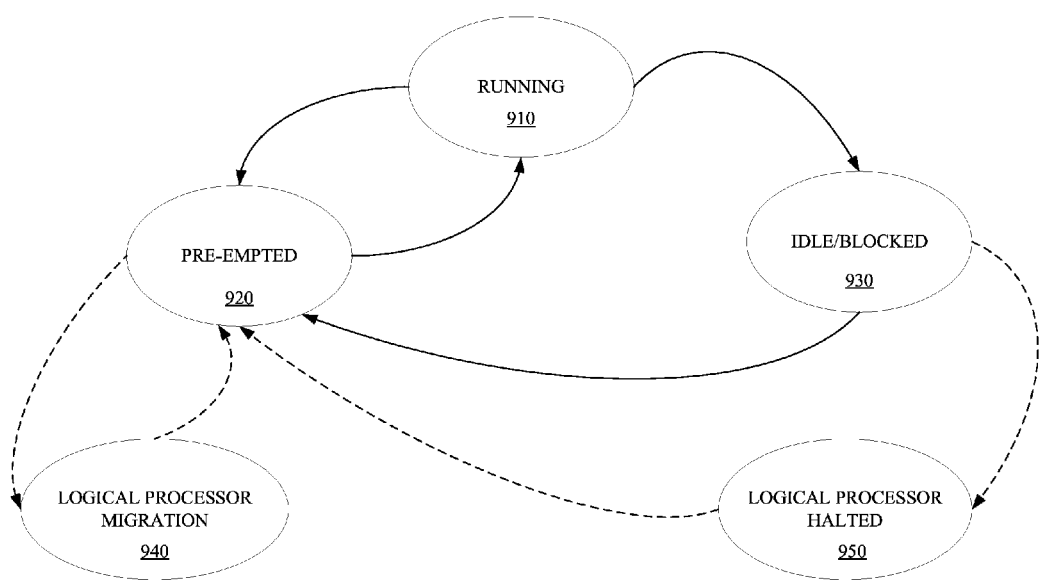
FIG. 9 is a state diagram illustrating one embodiment of virtual processor states.

According to one embodiment, VMM manages the processing of external interrupts targeting virtual processors during transitions between the Running, Pre-empted, and Idle/Blocked states. FIG. 9 is a state diagram illustrating one embodiment of virtual processor states. As shown in FIG. 9, Running state 910, Pre-empted state 920 and Idle/Blocked state 930 represent the virtual processor execution states. Additionally, states 940 and 950 are included, which represent virtual processor migration to another logical processor and logical processor halted, respectively.

Transition from Running State 910 to Pre-Empted State 920

As discussed above, a running virtual processor may be pre-empted by the VMM. In response, the processor masks interrupts as part of a virtual processor exit to the VMM. In a further embodiment, the VMM moves the virtual processor to a "pre-empted list of virtual processors on a logical processor. Subsequently, the VMM may atomically (e.g., LOCK OR) set the suppress flag in bit-field 730 the posted-interrupt descriptor of the virtual processor to suppress new interrupt posting notifications for the pre-empted virtual processor. In one embodiment, new interrupts for this preempted virtual processor continues to be posted to the posted-interrupt descriptor by remap unit 132 without notification interrupts. The VMM may now schedule other virtual processors from the pre-empted list on this logical processor.

Transition from Pre-Empted State 920 to Running State 910

According to one embodiment, the VMM may prioritize the scheduling of a virtual processor from the pre-empted list on a logical processor based on multiple factors (e.g., virtual processor priority, how long the virtual processor is waiting for quanta in the pre-empted list, if there are pending posted interrupts in a virtual processor posted-interrupt descriptor, etc.). Further, the VMM may scan the pIRR bits in the posted-interrupt descriptor to check if any bits are set in order to check whether there are pending posted interrupts in the posted-interrupt descriptor of a virtual processor. If any of the bits are set, there are one or more pending interrupts for that virtual processor virtual processor. VMM may subsequently adjust scheduling priority based on VMM software policies.

According to one embodiment, the VMM removes a virtual processor from the pre-empted list (e.g., because it is going to be transitioned to Running state 910), once the virtual processor is selected to be scheduled. Subsequently, the VMM atomically clears (e.g., LOCK AND command) the suppress flag in bit-field 730 to allow new interrupts posted to this posted-interrupt descriptor to generate the notification vector. In a further embodiment, the VMM issues an inter-processor interrupt (IPI) to itself (self-IPI) (e.g., via the APIC interrupt command register (ICR)) with the vector RNV. Since interrupts are blocked when running in the VMM, the self-IPI will be pending at the local component of a Programmable Interrupt Controller (LAPIC) until interrupts are enabled.

The VMM then schedules execution of the virtual processor by performing a VMLAUNCH or VMRESUME command, which causes VM-entry of the logical processor to a VMX guest mode. Entry into the VMX guest mode causes interrupts to be enabled by the processor, resulting in the self-IPI interrupt (with RNV vector) being accepted by the processor. Since the VMCS for the virtual processor has posted interrupts enabled with the notification vector as RNV, the CPU will detect the self-IPI interrupt as a notification vector and perform the normal posted interrupt processing of moving any pending interrupts in the posted-interrupt descriptor to the virtual-APIC of the virtual processor and injecting it as part of the virtual interrupt delivery processing. Thus, through the use of self-IPI with RNV vector, the VMM offloads processing of pending posted interrupts to CPU hardware for delivery to the virtual processor.

Transition from Running State 910 to Idle/Blocked State 930

According to one embodiment, a guest operating system executing on a virtual processor may detect that it is idle and execute a halt command instruction (HLT) that gets trapped by the VMM. In another embodiment, the guest operating system explicitly calls the VMM to indicate that it is idle. In response, the VMM atomically updates the notification vector field in the posted-interrupt descriptor of the virtual processor from RNV to BNV. In one embodiment, this update is performed through a LOCK CMPXCHG16B operation checking if an interrupt was posted (e.g., by checking an ON bit in the posted-interrupt descriptor) between the time the virtual processor executed HLT (or did VMCALL to indicate it was idle) and before the RNV was updated to BNV.

If a pending interrupt is detected (e.g., posted-interrupt descriptor is ON), the virtual processor is immediately moved to the pre-empted list (instead of to the blocked list), as the virtual processor is ready to be executed due to the pending posted interrupt. If the LOCK CMPXCHG16B succeeded, the VMM moves this virtual processor to a blocked list of virtual processors on the logical CPU. The VMM may then schedule another virtual processor from the pre-empted list by moving that virtual processor to the runnable state.

Transition from Idle/Blocked State 930 to Pre-Empted State 920

According to one embodiment, a notification event is generated by the IOMMU when an interrupt is posted to a blocked virtual processor. In such an embodiment, the notification event will be generated with the notification vector value of BNV since the posted-interrupt descriptor NV was already successfully changed to BNV when the virtual processor moved to blocked state.

If the CPU is operating in a VMX root-mode with interrupt disabled (e.g., the normal state in VMX root-mode), this notification interrupt with BNV is blocked until either the CPU returns to VMX non-root mode (e.g., as part of VMLAUNCH/VMRESUME of any virtual processor), or when the VMM enables interrupts as part of halting the logical CPU if all virtual processors are idle. In such embodiments, the BNV is delivered to the VMM either as part of VM-exit or as a vectored interrupt.

In one embodiment, a VMM handler for the BNV VM-exit/interrupt performs a normal end of interrupt (EOI) for the interrupt to dismiss from the LAPIC. Subsequently, the VMM handler scans the posted-interrupt descriptor of blocked list for virtual processors for this logical CPU, checking for virtual processors with pending interrupts (e.g., by looking for a posted-interrupt descriptor ON value of 1). Any virtual processors in the blocked list with a posted-interrupt descriptor ON value are moved to the pre-empted list after atomically updating (e.g., XCHG instruction) posted-interrupt descriptor NV to RNV. Accordingly, there can be two types of virtual processors in the pre-empted list: virtual processors that were running and pre-empted; and virtual processors that were idle/blocked and received a new pending interrupt. In both cases, the posted-interrupt descriptor NV equals RNV for pre-empted virtual processors.

Transition from Idle/Blocked State 930 to Halted State 950

According to one embodiment, the VMM may enable interrupts and either HLT the logical CPU or go to low power state by executing a MONITOR-MWAIT instruction (MWAIT) if no virtual processors are in the pre-empted list of a logical CPU (e.g., all in Blocked/Idle state 930).

Transition from Halted State 950 to Pre-Empted State 920

In one embodiment, the IOMMU will generate a notification vector (e.g., with vector RNV) when an interrupt is posted to any of the blocked virtual processors, resulting in the logical CPU coming out of HLT/MWAIT state and interrupt being delivered to the VMM. In such an embodiment, the VMM handler for this interrupt behaves the same as the transition from Idle/Blocked State 930 to Pre-empted State 920 discussed above. (e.g., EOI the interrupt, examine the posted-interrupt descriptor ON of virtual processors in the blocked list for this logical CPU and moving them to the pre-empted list by atomically modifying the posted-interrupt descriptor NV to RNV).

Transition from Pre-Empted State 920 to Virtual Processor Migration State 950

At any time, the VMM may load balance virtual processors in the pre-empted list of a logical CPU by dispatching them to the pre-empted list of other logical CPUs. In one embodiment, the VMM running on the logical CPU from which the virtual processor is migrated executes a VMCLEAR instruction to flush the VMCS state of this virtual processor to memory before the virtual processor can be migrated to run on another logical CPU.

To co-migrate the posted interrupts for this virtual processor, the VMM performs an atomic update to the posted-interrupt descriptor Dest-ID bit field 722 to change it to the APIC ID of the logical CPU to which the virtual processor is being migrated. The VMM did not have to handle any in-flight notifications for this virtual processor as the posted-interrupt descriptor suppress bit-field 730 was already set when this virtual processor moved to pre-empted state. Once these operations are completed, the virtual processor may be queued to the pre-empted list of virtual processors on the destination logical CPU, from where it can move to runnable state when it is scheduled to execute.

According to one embodiment, the above-described mechanism supports the posting of various types of interrupts. To support posting of level interrupts, an EOI exiting for a virtual processor to which level triggered interrupts are being posted is set up such that a guest EOI of a level triggered vector causes EOI VM-exit to the VMM. Subsequently, the VMM performs a directed-EOI to the IOAPIC that generated the level triggered interrupt to dismiss the interrupt when the VMM gets control on guest EOI execution. In such an embodiment, the directed-EOI to IOAPIC is performed (as opposed to EOI to local APIC) since the level triggered was posted and not delivered as a level triggered interrupt.

In one embodiment, interrupts that are specified to be lowest priority, without virtualization, are handled by hardware to different logical CPUs in either a round-robin basis, or by hashing a vector value to pick a logical CPU target. Such an embodiment enables hardware to load balance interrupts across a set of logical CPUs. Posted interrupt hardware posts interrupts only to a targeted virtual processor. Thus, if an external interrupt is specified to be lowest priority delivery mode by the guest software, the VMM performs the interrupt load-balancing in software by assigning different interrupts to be posted to the posted-interrupt descriptor of different virtual processors. The VMM may perform a scheme similar to what hardware does with vector hashing, but using the vector hash to assign the interrupt to a given posted-interrupt descriptor/virtual processor. In one embodiment, this process is performed at setup time when the IRTE for the interrupt is initialized and does not affect how this interrupts are delivered to virtual processors.

In a further embodiment, the above-described mechanism supports posting of urgent interrupts. On conventional platforms/segments, certain types of interrupts assigned to virtual machines may have hard or soft real-time requirements, which require them to be delivered to the guest with lowest latency. These may include, for example, interrupts from media devices (audio/display) in a client platform, interrupts from modem devices on handheld platforms, interrupts from high-performance message passing or RDMA interconnects in server platforms, etc.

For hard-real time usages, the VMM often dedicates the virtual processors of such VMs to a specific set of logical CPUs, thus ensuring that the virtual processors is running most all the time on those logical CPUs (enabling direct delivery of interrupts to running virtual processors), and getting VMM control immediately on interrupts to blocked virtual processors, so that VMM may quickly transition such virtual processors from the Idle/Blocked state to Pre-empted state to Running state.

For soft-real time usages, however, the VMM may oversubscribe the logical CPUs with multiple virtual processors, thus introducing situations where a virtual processor that is a target of a soft real-time interrupt may be in the Pre-empted state when such an interrupt is posted to its posted-interrupt descriptor. Since the posted-interrupt descriptor S bit-field 730 is normally set to 1 when a virtual processors goes to the Pre-empted state, no notification events would be generated normally when interrupts are posted to pre-empted virtual processors. These interrupts are detected by the VMM at the next scheduling quanta expiration, which can cause longer latencies for such soft-real time interrupts.

According to one embodiment, this issue is resolved by specifying such soft real-time interrupts as urgent interrupts in the corresponding IRTE (e.g., by setting the IRTE URG bit in bit-field 612 to 1). Also, when a virtual processor that is a target for any urgent interrupt is pre-empted, the posted-interrupt descriptor NV for the virtual processor may be updated to a different notification vector (e.g., the URG bit in bit-field 612) in the Running state 910 to Pre-empted state 920 transition.

In a further embodiment, urgent interrupts are handled in a manner similar to non-urgent interrupts, except that the posted-interrupt descriptor S bit-field 730 is ignored by hardware for urgent interrupts. Thus, a notification event is still generated with the URG bit in bit-field 612 if an urgent interrupt arrives for a virtual processor that is in the Pre-empted state (thus having URG bit in bit-field 612=1). The VMM handler for URG bit in bit-field 612 in the VMM may determine the virtual processor with pending urgent interrupts and prioritize scheduling of such virtual processor to minimize the interrupt delivery latency.

Figure 10:
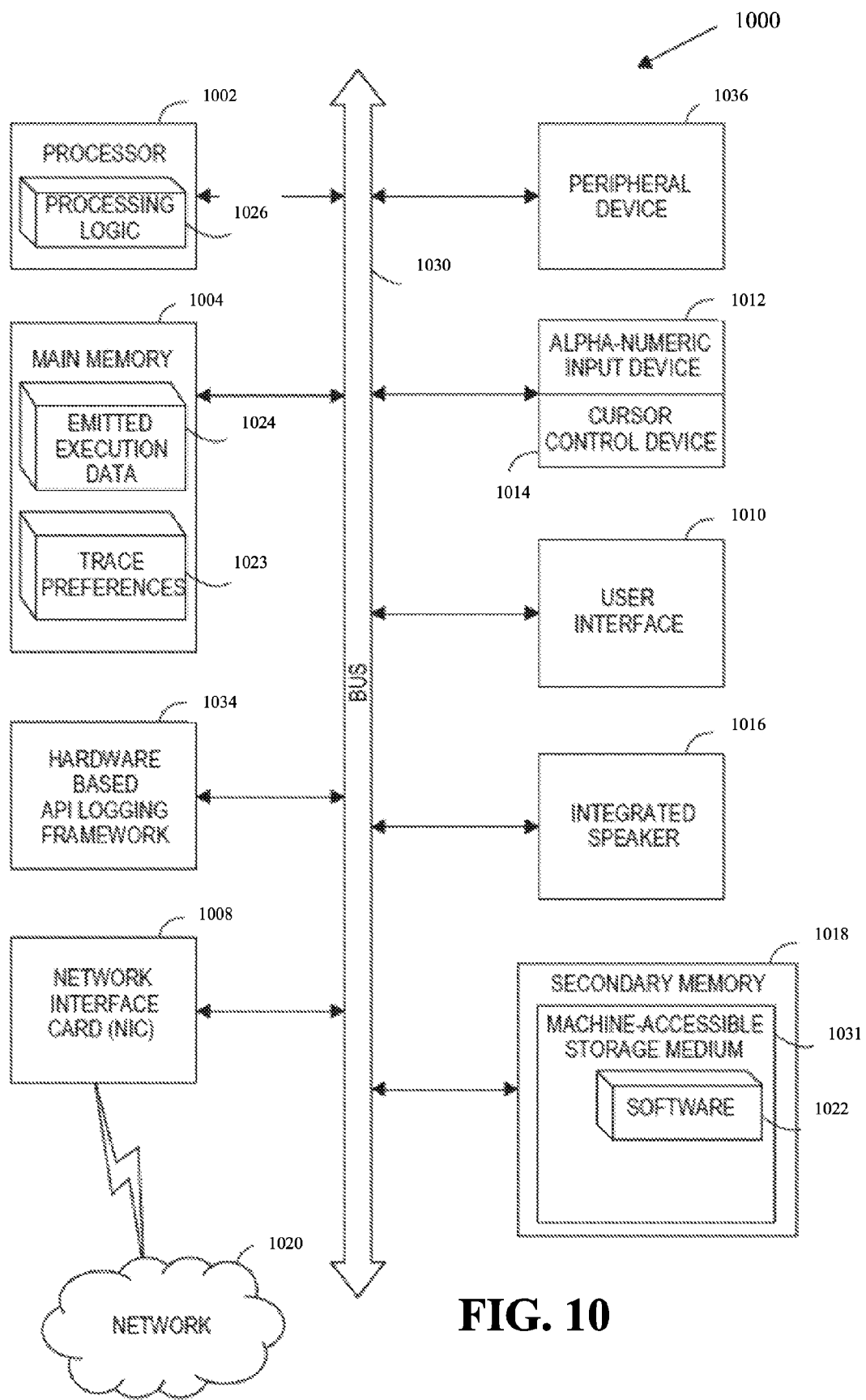
FIG. 10 illustrates one embodiment of a computer system.

FIG. 10 illustrates a diagrammatic representation of a machine 1000 in the exemplary form of a computer system, in accordance with one embodiment, within which a set of instructions, for causing the machine 1000 to perform any one or more of the methodologies discussed herein, may be executed. Machine 1000 is the same as or similar to information processing system 100 of FIG. 1. In alternative embodiments, the machine may be connected (e.g., networked) to other machines in a network, such as Internet of Things ("IoT") or Cloud of Things ("CoT"), a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services.

Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1018 (e.g., a persistent storage device including hard disk drives and persistent multi-tenant data base implementations), which communicate with each other via a bus 1030. Main memory 1004 includes emitted execution data 1024 (e.g., data emitted by a logging framework) and one or more trace preferences 1023 which operate in conjunction with processing logic 1026 and processor 1002 to perform the methodologies discussed herein.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations and functionality of the above-described VMM posted interrupt mechanism.

The computer system 1000 may further include a network interface card 1008. The computer system 1000 also may include a user interface 1010 (such as a video display unit, a liquid crystal display (LCD), or a cathode ray tube (CRT)), an alphanumeric input device 1012 (e.g., a keyboard), a cursor control device 1014 (e.g., a mouse), and a signal generation device 1016 (e.g., an integrated speaker). The computer system 1000 may further include peripheral device 1036 (e.g., wireless or wired communication devices, memory devices, storage devices, audio processing devices, video processing devices, etc. The computer system 1000 may further include a Hardware based API logging framework 1034 capable of executing incoming requests for services and emitting execution data responsive to the fulfillment of such incoming requests.

The secondary memory 1018 may include a machine-readable storage medium (or more specifically a machine-accessible storage medium) 1031 on which is stored one or more sets of instructions (e.g., software 1022) embodying any one or more of the methodologies or functions described above. The software 1022 may also reside, completely or at least partially, within the main memory 1004 and/or within the processor 1002 during execution thereof by the computer system 1000, the main memory 1004 and the processor 1002 also constituting machine-readable storage media. The software 1022 may further be transmitted or received over a network 1020 via the network interface card 1008. The machine-readable storage medium 1031 may include transitory or non-transitory machine-readable storage media.

Portions of various embodiments may be provided as a computer program product, which may include a machine-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes a method comprising receiving an interrupt targeting a virtual processor, determining a status of the virtual processor and directly delivering the interrupt to the virtual processor upon determining that the virtual processor is operating in a running state.

Example 2 includes the subject matter of Example 1, wherein the delivery of the interrupt is performed without involvement of a virtual machine monitor (VMM).

Example 3 includes the subject matter of Example 2, further comprising storing the interrupt in a buffer upon determining that the virtual processor is operating in a pre-empted state and delivering the interrupt to the virtual processor upon the virtual processor transitioning from the pre-empted state to the running state.

Example 4 includes the subject matter of Example 3, further comprising the VMM issuing an inter-processor interrupt (IPI) to itself (self-IPI) after removing the virtual processor from the pre-empted list.

Example 5 includes the subject matter of Example 4, further comprising delivering the interrupt to the VMM upon determining that the virtual processor is operating in an idle state; and the VMM scheduling the interrupt at the virtual processor.

Example 6 includes the subject matter of Example 5, further comprising migrating interrupts to the virtual processor upon the virtual transitioning to a different state.

Example 7 includes the subject matter of Example 6, wherein migrating interrupts comprises determining that the virtual processor transitioned from the running state to the pre-empted state; blocking interrupts to the virtual processor; moving the virtual processor to a pre-empted list; and suppressing interrupt posting notifications for the virtual processor.

Example 8 includes the subject matter of Example 7, wherein migrating interrupts further comprises determining that the virtual processor transitioned from the pre-empted state to the running state, removing the virtual processor from the pre-empted list and delivering pending interrupts to the virtual processor.

Example 9 includes the subject matter of Example 8, wherein migrating interrupts comprises determining that the virtual processor transitioned from the running state to the idle state, updating a vector in a data structure that the virtual CPU has transitioned from the running state to the idle state and moving the virtual processor to a blocked list.

Example 10 includes the subject matter of Example 9, wherein migrating interrupts further comprises moving the virtual processor to the pre-empted list if one or more pending interrupts have been detected prior to moving the virtual processor to the blocked list.

Example 11 includes the subject matter of Example 9, wherein migrating interrupts comprises determining that the virtual processor transitioned from the idle state to the pre-empted state and moving the virtual processor from the blocked list to the pre-empted list.

Example 12 includes the subject matter of Example 5, wherein the interrupts comprise level interrupts.

Example 13 includes the subject matter of Example 5, wherein the interrupts comprise real time interrupts.

Example 14 includes the subject matter of Example 13, wherein the real time interrupts are specified as urgent interrupts in the data structure.

Some embodiments pertain to Example 15 that includes an apparatus comprising look-up logic receive an interrupt targeting a virtual processor and determine a status of the virtual processor and posting logic to directly deliver the interrupt to the virtual processor upon determining that the virtual processor is operating in a running state.

Example 16 includes the subject matter of Example 15, wherein the posting logic stores the interrupt in a buffer upon determining that the virtual processor is operating in a pre-empted state and delivers the interrupt to the virtual processor upon the virtual processor transitioning from the pre-empted state to the running state.

Example 17 includes the subject matter of Example 16, further comprising a virtual machine monitor (VMM) to receive the interrupt to the VMM upon the posting logic determining that the virtual processor is operating in an idle state and to VMM schedule the interrupt at the virtual processor.

Example 18 includes the subject matter of Example 17, further comprising a first notification vector to deliver the interrupt to the virtual processor upon determining that the virtual processor is operating in a running state and a second notification vector to deliver the interrupt to the VMM upon determining that the virtual processor is operating in the idle state.

Example 19 includes the subject matter of Example 17, further comprising a third notification vector to deliver the interrupt to a second virtual processor upon determining that the second virtual processor is operating in a running state and a fourth notification vector to deliver the interrupt to the VMM upon determining that the second virtual processor is operating in the idle state.

Example 20 includes the subject matter of Example 17, wherein the VMM migrates interrupts to the virtual processor upon the virtual transitioning to a different state.

Some embodiments pertain to Example 21 that includes a computer readable medium having instructions, which when executed by a processor, cause the processor to perform receiving an interrupt targeting a virtual processor, determining a status of the virtual processor and directly delivering the interrupt to the virtual processor upon determining that the virtual processor is operating in a running state.

Example 22 includes the subject matter of Example 21, wherein the delivery of the interrupt is performed without involvement of a virtual machine monitor (VMM).

Example 23 includes the subject matter of Example 22, further comprising storing the interrupt in a buffer upon determining that the virtual processor is operating in a pre-empted state and delivering the interrupt to the virtual processor upon the virtual processor transitioning from the pre-empted state to the running state.

Example 24 includes the subject matter of Example 23, further comprising delivering the interrupt to the VMM upon determining that the virtual processor is operating in an idle state and the VMM scheduling the interrupt at the virtual processor.

Example 25 includes the subject matter of Example 24, further cause the processor to perform migrating interrupts to the virtual processor upon the virtual transitioning to a different state.

Some embodiments pertain to Example 26 that includes a system comprising a physical processor to support a virtualization environment to run a virtual processor, a device to generate an interrupt request to the virtual processor, look-up logic receive an interrupt targeting the virtual processor and determine a status of the virtual processor and posting logic to directly deliver the interrupt to the virtual processor upon determining that the virtual processor is operating in a running state.

Example 27 includes the subject matter of Example 26, wherein the posting logic stores the interrupt in a buffer upon determining that the virtual processor is operating in a pre-empted state and delivers the interrupt to the virtual processor upon the virtual processor transitioning from the pre-empted state to the running state.

Example 28 includes the subject matter of Example 27, further comprising a virtual machine monitor (VMM) to receive the interrupt to the VMM upon the posting logic determining that the virtual processor is operating in an idle state and to VMM schedule the interrupt at the virtual processor.

Example 29 includes the subject matter of Example 28, wherein the VMM migrates interrupts to the virtual processor upon the virtual transitioning to a different state.

Some embodiments pertain to Example 30 that includes a method for delivering interrupts to a virtual processor comprising receiving an interrupt targeting a virtual processor, determining a status of the virtual processor and directly delivering the interrupt to the virtual processor upon determining that the virtual processor is operating in a running state.

Example 31 includes the subject matter of Example 30, wherein the delivery of the interrupt is performed without involvement of a virtual machine monitor (VMM).

Example 32 includes the subject matter of Example 31, further comprising storing the interrupt in a buffer upon determining that the virtual processor is operating in a pre-empted state and delivering the interrupt to the virtual processor upon the virtual processor transitioning from the pre-empted state to the running state.

Example 33 includes the subject matter of Example 32, further comprising the VMM issuing an inter-processor interrupt (IPI) to itself (self-IPI) after removing the virtual processor from the pre-empted list.

Example 34 includes the subject matter of Example 33, further comprising delivering the interrupt to the VMM upon determining that the virtual processor is operating in an idle state and the VMM scheduling the interrupt at the virtual processor.

Example 35 includes the subject matter of Example 34, further comprising migrating interrupts to the virtual processor upon the virtual transitioning to a different state.

Example 36 includes the subject matter of Example 35, wherein migrating interrupts comprises determining that the virtual processor transitioned from the running state to the pre-empted state, blocking interrupts to the virtual processor, moving the virtual processor to a pre-empted list and suppressing interrupt posting notifications for the virtual processor.

Example 37 includes the subject matter of Example 36, wherein migrating interrupts further comprises determining that the virtual processor transitioned from the pre-empted state to the running state, removing the virtual processor from the pre-empted list and delivering pending interrupts to the virtual processor.

Example 38 includes the subject matter of Example 37, wherein migrating interrupts comprises determining that the virtual processor transitioned from the running state to the idle state, updating a vector in a data structure that the virtual CPU has transitioned from the running state to the idle state and moving the virtual processor to a blocked list.

Example 39 includes the subject matter of Example 38, wherein migrating interrupts further comprises moving the virtual processor to the pre-empted list if one or more pending interrupts have been detected prior to moving the virtual processor to the blocked list.

Example 40 includes the subject matter of Example 39, wherein migrating interrupts comprises determining that the virtual processor transitioned from the idle state to the pre-empted state and moving the virtual processor from the blocked list to the pre-empted list.

Example 41 includes the subject matter of Example 34, wherein the interrupts comprise level interrupts.

Example 42 includes the subject matter of Example 34, wherein the interrupts comprise real time interrupts.

Example 43 includes the subject matter of Example 42, wherein the real time interrupts are specified as urgent interrupts in the data structure.

Some embodiments pertain to Example 44 that includes an apparatus for delivering interrupts to a virtual processor comprising look-up logic receive an interrupt targeting a virtual processor and determine a status of the virtual processor and posting logic to directly deliver the interrupt to the virtual processor upon determining that the virtual processor is operating in a running state.

Example 45 includes the subject matter of Example 44, wherein the posting logic stores the interrupt in a buffer upon determining that the virtual processor is operating in a pre-empted state and delivers the interrupt to the virtual processor upon the virtual processor transitioning from the pre-empted state to the running state.

Example 46 includes the subject matter of Example 45, further comprising a virtual machine monitor (VMM) to receive the interrupt to the VMM upon the posting logic determining that the virtual processor is operating in an idle state and to VMM schedule the interrupt at the virtual processor.

Example 47 includes the subject matter of Example 46, further comprising a first notification vector to deliver the interrupt to the virtual processor upon determining that the virtual processor is operating in a running state and a second notification vector to deliver the interrupt to the VMM upon determining that the virtual processor is operating in the idle state.

Example 48 includes the subject matter of Example 46, further comprising a third notification vector to deliver the interrupt to a second virtual processor upon determining that the second virtual processor is operating in a running state and a fourth notification vector to deliver the interrupt to the VMM upon determining that the second virtual processor is operating in the idle state.

Example 49 includes the subject matter of Example 46, wherein the VMM migrates interrupts to the virtual processor upon the virtual transitioning to a different state.

Some embodiments pertain to Example 50 that includes a computer readable medium having instructions, which when executed by a processor, cause the processor to perform the method of examples 30-43.

Some embodiments pertain to Example 51 that includes a system comprising a physical processor to support a virtualization environment to run a virtual processor, a device to generate an interrupt request to the virtual processor, look-up logic receive an interrupt targeting the virtual processor and determine a status of the virtual processor and posting logic to directly deliver the interrupt to the virtual processor upon determining that the virtual processor is operating in a running state.

Example 52 includes the subject matter of Example 51, wherein the posting logic stores the interrupt in a buffer upon determining that the virtual processor is operating in a pre-empted state and delivers the interrupt to the virtual processor upon the virtual processor transitioning from the pre-empted state to the running state.

Example 53 includes the subject matter of Example 52, further comprising a virtual machine monitor (VMM) to receive the interrupt to the VMM upon the posting logic determining that the virtual processor is operating in an idle state and to VMM schedule the interrupt at the virtual processor.

Example 54 includes the subject matter of Example 53, wherein the VMM migrates interrupts to the virtual processor upon the virtual transitioning to a different state.

Some embodiments pertain to Example 55 that includes a method for delivering interrupts to a virtual processor comprising receiving an interrupt targeting a virtual processor, determining a status of the virtual processor and directly delivering the interrupt to the virtual processor upon determining that the virtual processor is operating in a running state.

Example 56 includes the subject matter of Example 55, wherein the delivery of the interrupt is performed without involvement of a virtual machine monitor (VMM).

Example 57 includes the subject matter of Example 56, further comprising storing the interrupt in a buffer upon determining that the virtual processor is operating in a pre-empted state and delivering the interrupt to the virtual processor upon the virtual processor transitioning from the pre-empted state to the running state.

Example 58 includes the subject matter of Example 57, further comprising the VMM issuing an inter-processor interrupt (IPI) to itself (self-IPI) after removing the virtual processor from the pre-empted list.

Example 59 includes the subject matter of Example 58,further comprising delivering the interrupt to the VMM upon determining that the virtual processor is operating in an idle state and the VMM scheduling the interrupt at the virtual processor.

Example 60 includes the subject matter of Example 59, further comprising migrating interrupts to the virtual processor upon the virtual transitioning to a different state.

Example 61 includes the subject matter of Example 60, wherein migrating interrupts comprises determining that the virtual processor transitioned from the running state to the pre-empted state, blocking interrupts to the virtual processor, moving the virtual processor to a pre-empted list and suppressing interrupt posting notifications for the virtual processor.

Example 62 includes the subject matter of Example 61, wherein migrating interrupts further comprises determining that the virtual processor transitioned from the pre-empted state to the running state, removing the virtual processor from the pre-empted list and delivering pending interrupts to the virtual processor.

Example 63 includes the subject matter of Example 62, wherein migrating interrupts comprises determining that the virtual processor transitioned from the running state to the idle state, updating a vector in a data structure that the virtual CPU has transitioned from the running state to the idle state and moving the virtual processor to a blocked list.

Example 64 includes the subject matter of Example 63, wherein migrating interrupts further comprises moving the virtual processor to the pre-empted list if one or more pending interrupts have been detected prior to moving the virtual processor to the blocked list.

Example 65 includes the subject matter of Example 63, wherein migrating interrupts comprises determining that the virtual processor transitioned from the idle state to the pre-empted state and moving the virtual processor from the blocked list to the pre-empted list.

Some embodiments pertain to Example 66 that includes an apparatus for delivering interrupts to a virtual processor comprising look-up logic receive an interrupt targeting a virtual processor and determine a status of the virtual processor and posting logic to directly deliver the interrupt to the virtual processor upon determining that the virtual processor is operating in a running state.

Example 67 includes the subject matter of Example 66, wherein the posting logic stores the interrupt in a buffer upon determining that the virtual processor is operating in a pre-empted state and delivers the interrupt to the virtual processor upon the virtual processor transitioning from the pre-empted state to the running state.

Example 68 includes the subject matter of Example 67, further comprising a virtual machine monitor (VMM) to receive the interrupt to the VMM upon the posting logic determining that the virtual processor is operating in an idle state and to VMM schedule the interrupt at the virtual processor.

Some embodiments pertain to Example 69 that includes a computer readable medium having instructions, which when executed by a processor, cause the processor to perform the method of examples 55-64.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method of processing external interrupts for virtual processors using a host processor, the method comprising:

configuring a virtual machine monitor (VMM) in a host processor, the host processor having at least one logical processor and the VMM controlling a plurality of virtual processors for the at least one logical processor, the controlling including:

allocating at least two physical interrupt vectors in the host processor, including a running notification vector (RNV) for posting interrupts to running virtual processors and a blocked notification vector (BNV) for posting interrupts to blocked virtual processors;

masking interrupts posted to preempted virtual processors, the preempted virtual processors including previously blocked virtual processors having at least one posted interrupt and previously running virtual processors; and enabling delivery of notifications for masked interrupts using the RNV upon transitioning a preempted virtual processor to a running virtual processor.

2. The method of claim 1, wherein enabling delivery of notifications for masked interrupts using the RNV includes:

issuing a self inter-processor interrupt (self-IPI) to the VMM;

detecting the self-IPI at the host processor upon transitioning a preempted virtual processor into a running virtual processor;

performing posted interrupt processing at the host processor upon detecting the self-IPI, including moving any masked interrupts to the virtual interrupt controller for delivery of notifications.

3. The method of claim 1, further comprising:

receiving a notification event from the BNV for a blocked virtual processor; and transitioning the blocked virtual processor into a preempted virtual processor.

4. The method of claim 1, further comprising:

migrating interrupts posted for preempted virtual processors being migrated to a new destination logical processor, including updating any posted interrupts for the migrated virtual processors to a new destination interrupt controller for the new destination logical processor; and queueing the migrated virtual processors to the preempted list of preempted virtual processors on the new destination logical processor.

\* \* \* \* \*